United States Patent [19]

Morrone, III

[11] 4,416,038

[45] Nov. 22, 1983

[54] BALLOON CLIP

[75] Inventor: Joseph A. Morrone, III, Westerly, R.I.

[73] Assignee: Adecon, Inc., Warwick, R.I.

[21] Appl. No.: 381,535

[22] Filed: May 24, 1982

[51] Int. Cl.³ .............................................. A44B 21/00
[52] U.S. Cl. ............................................ 24/487; 46/90; 24/543
[58] Field of Search ............ 24/248 R, 248 B, 30.5 R, 24/30.5 W, 30.5 P, 30.5 S, 255 SL, 132 WL; 46/90; 128/346

[56] References Cited

U.S. PATENT DOCUMENTS

| | | | |
|---|---|---|---|
| 2,818,871 | 1/1958 | Beaudry | 24/30.5 P |
| 3,874,042 | 4/1975 | Eddleman et al. | 24/255 SL |
| 3,978,555 | 9/1976 | Weisenthal | 46/90 |
| 4,038,726 | 8/1977 | Takabayashi | 24/255 SL |
| 4,128,922 | 12/1978 | Hutchison | 24/30.5 R |
| 4,291,855 | 9/1981 | Schenkel et al. | 24/255 SL |
| 4,356,599 | 11/1982 | Larson et al. | 24/248 B |

FOREIGN PATENT DOCUMENTS 273781  3/1930  Italy ..................................... 24/30.5

Primary Examiner—Paul J. Hirsch
Attorney, Agent, or Firm—Salter & Michaelson

[57] ABSTRACT

A closure device for the tubular stem of an inflated balloon, including a pair of legs which are hingedly interconnected for movement from an open to a closed position wherein they are in substantially parallel spaced relation. Closure members on the legs extend towards the opposite respective legs and include shoulder portions which interlock when the device is in said closed position to define a tortuous path through which a balloon stem extends and is clamped to effect the sealing thereof. Retaining members which are preferably similar in configuration to the closure members are provided to retain the device in its closed position.

5 Claims, 5 Drawing Figures

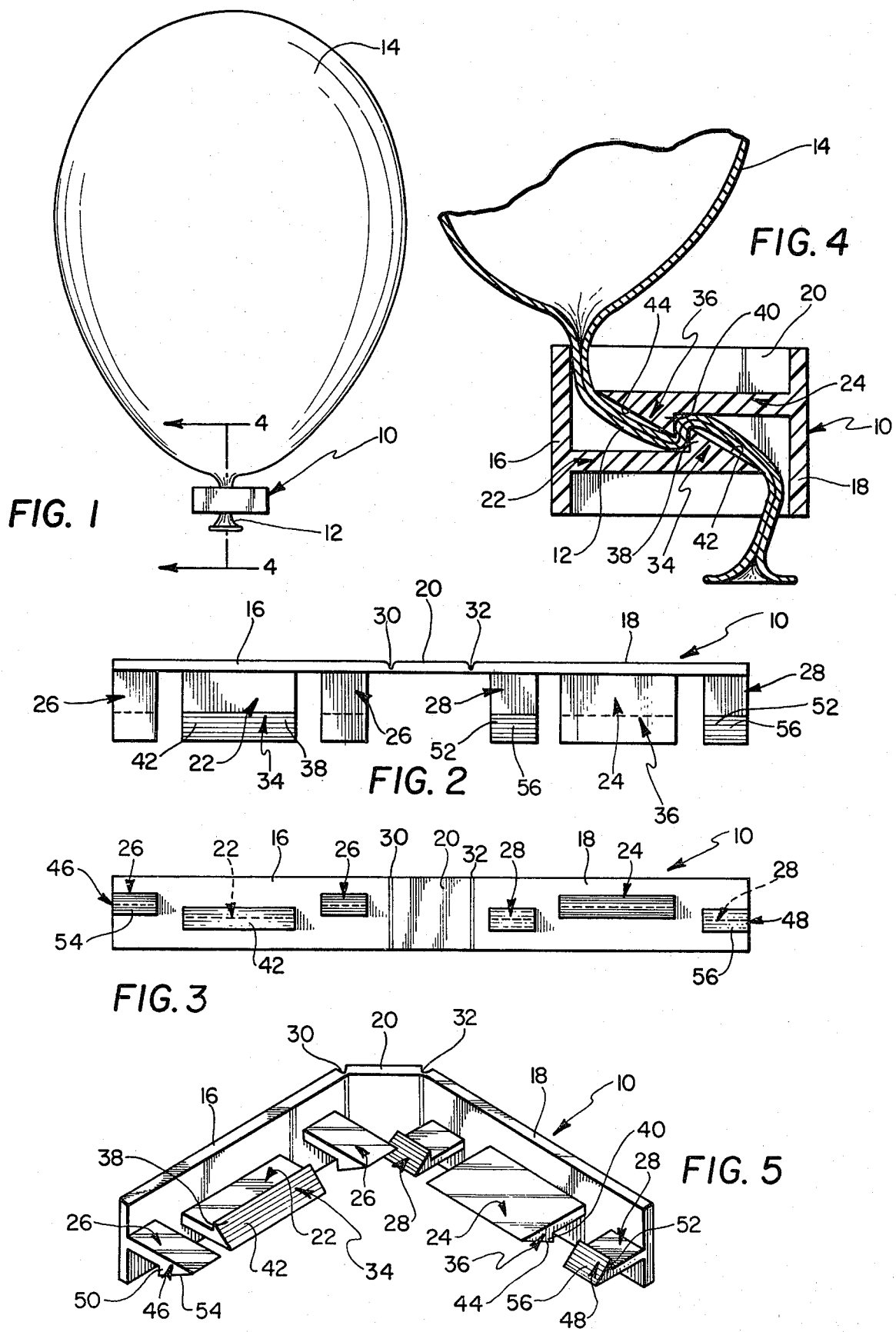

BALLOON CLIP

BACKGROUND AND SUMMARY OF THE INVENTION

The instant invention relates to closure devices for flexible tubular members and more particularly, to a clamp for sealingly closing the tubular stem of an inflated balloon.

The sealing of the stems of inflated balloons has heretofore presented somewhat of a problem because of the fact that even minor amounts of stem manipulation can cause significant leakage of gas from balloons. Traditionally, balloon users have sealed the stems of balloons by tying knots therein, but this has had the above disadvantage in that it has required substantial stem manipulation and therefore has frequently resulted in substantial gas leakage. In addition, even after the knot has been tied, slow leakage frequently occurs. The instant invention overcomes these disadvantages by providing a closure device which may be installed on the tubular stem of a balloon to offset the sealing thereof without significant manipulation and which provides a substantially leak-proof seal.

Devices representing the closest prior art to the instant invention of which the applicant is aware are illustrated in the U.S. patents to LAUGHERTY et al, U.S. Pat. No. 3,854,482; MILLER et al, U.S. Pat. No. 3,896,527; WEISENTHAL, U.S. Pat. No. 3,900,989; WEISENTHAL, U.S. Pat. No. 3,978,555 and NOLAN, U.S. Pat. No. 4,212,303. Of these patents, the ones to LAUGHERTY et al, MILLER et al and NOLAN relate to devices which have substantial structural differences from the clamp of the instant invention and are intended primarily for use in medical applications. The patents to WEISENTHAL et al relate to clamps for sealing the stems of balloons but differ substantially both structurally and conceptually from the clamp of the instant invention. More particularly, the device disclosed in the WEISENTHAL patents effects sealing of the steam of a balloon by applying pressure to opposite sides thereof to squeeze the stem and retain it in a collapsed disposition. In contrast, the clamp of the instant invention is operable to retain the stem of a balloon in a collapsed disposition wherein it is interposed between various elements of the clamp in a tortuous path to provide improved positive sealing of the balloon stem. As a result, while devices have heretofore been available for sealing balloon stems, the clamp of the instant invention nevertheless represents a significant improvement in the art because it retains the stem of a balloon in a manner wherein gas leakage is virtually eliminated.

The device of the instant invention includes a pair of legs which are hingedly interconnected so that they are movable to a closed position of the device wherein they are in generally parallel spaced relation. Closure members extend outwardly from each of the legs toward the opposite legs in slightly offset relation to each other when the legs are in the closed positions thereof and shoulder portions on the closure members are received in interlocked relation with each other when the legs are in the closed positions thereof. Accordingly, when the device is in its closed position, the closure members with the shoulders thereof cooperate in interlocked relation to define a tortuous path wherein the stem of a balloon is receivable in collapsed disposition interposed between the closure members to provide a positive sealing of said stem. Retaining members are provided also extending from the legs toward the opposite respective legs and are received in interlocked engagement when the legs are moved to the closed positions thereof to securely retain the clamp in its closed position and thereby retain the balloon stem between the closure members. The clamp is preferably formed in a unitary construction wherein the legs are interconnected by a living hinge and it may be molded of suitable plastic material to provide an inexpensive clamp which is nevertheless durable and effective.

Accordingly, it is a primary object of the instant invention to provide a positive closure device for the stem of an inflated balloon and the like.

Another object of the instant invention is to provide a balloon stem closure device whereby the stem of a balloon is retainable in a tortuous path to provide positive sealing thereof.

Another object of the instant invention is to provide an inexpensive balloon stem closure device which may be molded in unitary construction.

Other objects, features and advantages of the invention shall become apparent as the description thereof proceeds when considered in connection wth the accompanying illustrative drawing.

DESCRIPTION OF THE DRAWING

In the drawing which illustrates the best mode presently contemplated for carrying out the present invention:

FIG. 1 is a front elevational view of a balloon with a closure device of the instant invention on the stem thereof;

FIG. 2 is a top plan view of the closure device in the open position thereof;

FIG. 3 is a side elevational view thereof;

FIG. 4 is an enlarged side sectional view taken along line 4—4 in FIG. 1; and

FIG. 5 is a perspective view of the closure device.

DESCRIPTION OF THE INVENTION

Referring now to the drawing, the closure device of the instant invention is generally indicated at 10 in FIGS. 1 through 5. The device 10, as illustrated in FIGS. 1 and 4, is operable to effect the sealing of a stem 12 of a balloon 14 whereby th balloon 14 may be maintained in an inflated disposition.

The device 10 generally comprises first and second legs 16 and 18, a hinge portion 20 which hingedly interconnects the legs 16 and 18, closure members 22 and 24 which extend outwardly from the legs 16 and 18, respectively, and retaining members 26 and 28 which also extend outwardly from the legs 16 and 18, respectively. The device 10 is movable to a closed position wherein the legs are in substantially parallel spaced relation and wherein the retaining members 26 and 28 and the closure members 22 and 24 are in interlocked relation.

The legs 16 and 18 comprise elongated members which are preferably integrally molded of a suitable substantially rigid plastic material with the hinge portion 20 in a unitary construction. Accordingly, the hinge portion which includes spaced score lines 30 and 32 of reduced thickness as illustrated most clearly in FIGS. 2 and 5 whereby the legs 16 and 18 are hingeable to closed positions thereof wherein they are in substantially parallel spaced relation.

The closure members 22 and 24 extend outwardly from the members 16 and 18, respectively, and include latch portions 34 and 36, respectively, which are defined by shoulder portions 38 and 40 and beveled surfaces 42 and 44 which extend generally to the terminal ends of the respective members 22 and 24. The closure members 22 and 24 are disposed on their respective legs 16 and 18 so that when the device 10 is in the closed position thereof, they are in slightly offset relation to each other with the respective shoulders 38 and 40 thereof facing the opposite respective closure members 22 and 24, whereby they are receivable in interlocked relation as will hereinafter be brought out. The closure members 22 and 24 are preferably integrally molded with the legs 16 and 18 of a suitable substantially rigid plastic material, although they must be at least slightly resiliently flexible. Further, it should be brought out that the members 22 and 24 must be dimensioned at least wide enough to receive the entire stem 12 in a collapsed disposition therebetween.

The retaining members 26 and 28 are similar in configuration to the closure members 22 and 24 and include latch portions 46 and 48, respectively, which are defined by shoulder portions 50 and 52, respectively, and beveled surfaces 54 and 56, respectively, which extend generally to the terminal ends of the respective members 26 and 28. The retaining members 26 are disposed on the respective legs 16 and 18 in inverted relation to the respective retaining members 28 on the opposite respective legs 16 and 18 are preferably also in inverted relation to the respective closure members 22 and 24 on the same respective legs 16 and 18. The retaining members 26 and 28 also must be at least slightly resiliently flexible and are preferably integrally molded with the respective legs 16 and 18 thereof of a suitable substantially rigid plastic material which is nevertheless at least slightly risiliently flexible. It is understood, however, that the use of retaining members of other configurations or the use of other means for retaining the legs 16 and 18 in the closed positions thereof is contemplated.

Accordingly, when the legs 16 and 18 are moved to the closed position thereof, the retaining members 26 and 28 and the closure members 22 and 24 are moved into interlocked engagement, i.e., the shoulders 50 and 52, and the shoulders 38 and 40 are moved into engagement. More particularly, as the members 16 and 18 are moved to the closed positions thereof, the beveled surfaces 54 engage the beveled surfaces 56 causing the respective members 22 and 24 and 26 and 28 thereof to be slightly deflected to permit the passage of the shoulders 38 and 40 and the shoulders 50 and 52 into interlocked relation. Further, when, as in the preferred embodiment, the retaining members 26 and 28 are in inverted relation to the closure members 22 and 24 on the same respective legs 16 and 18, the closure members 22 and 24 cooperate with the retaining members 26 and 28 to retain each other in interlocked relation.

As will be seen particularly from FIG. 4, when the legs 16 and 18 are in the closed positions thereof with the members 22 and 24 and the members 26 and 28 in interlocked relation, the members 22 and 24 cooperate to define a tortuous path for the stem 12. In particular, the stem 12 is receivable in interposed relation between the closure members 22 and 24 so that it extends along the beveled surfaces 42 and 44 thereof between the shoulders 38 and 40 thereof whereby the stem 12 is retained in a collapsed and compressed disposition in said tortuous path to prevent the passage of gas from the balloon 14 therethrough.

It is seen, therefore, that the clamp 10 of the instant invention provides an effective means for sealing the stem 12 of the balloon 14. The clamp 10 may be positioned on the stem 12 without substantial manipulation of either the clamp 10 or the stem 12, whereby the stem 12 is sealable without significant leakage of gas from the balloon 14. Further, by retaining the stem 12 in a resiliently compressed disposition in a tortuous path, positive sealing of the balloon 14 is effected so that the balloon 14 may be retained in an inflated disposition without significant leakage for an extended period of time. Consequently, it is seen that the instant invention provides significant improvement in the art which is of substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A closure device for sealing the flexible tubular stem of an inflated balloon and the like comprising:
   a. a first leg;
   b. a second leg;
   c. hinge means interconnecting said first and second legs so that they are movable to closed positions thereof wherein they are in substantially parallel spaced relation;
   d. means for retaining said legs in the closed positions thereof;
   e. a first clsoure member attached to said first leg and extending generally toward said second leg when said legs are in the closed positions thereof and including a raised shoulder thereon having a beveled outer surface which extends generally to the terminal end of said first closure member;
   f. a second closure member attached to said second leg and is of substantially the same configuration as said first closure member, said second closure member extending outwardly from said second leg in inverted, slightly offset relation to said first closure member with the raised shoulders of said closure members on the same respective sides thereof as the opposite respective closure members, whereby when said legs are moved to the closed position thereof said closure members are deflected slightly to permit the passage of the shoulders thereof into interlocked relation with the shoulders thereof cooperating to define a tortuous path for sealingly securing said stem.

2. In the device of claim 1, said retaining means comprising:
   a. a first retaining member which is attached to said first leg and extends generally toward said second leg when said legs are in the closed position thereof and includes a raised shoulder thereon; and
   b. a second retaining member which is attached to said second leg and is of substantially the same configuration as said first retaining member, said second retaining member extending outwardly from said second leg in inverted, slightly offset relation to said first retaining member with the raised shoulders of said retaining members on the same respective sides thereof as the opposite respective retaining members, whereby when said legs are moved to the closed positions thereof said retaining members are received in interlocked relation with the shoulders thereof in engagement to retain said legs in the closed position thereof.

3. The device of claims 1 or 2 further characterized as being of unitary construction, said hinge means further characterized as a living hinge.

4. In the device of claim 2, said retaining member shoulders further characterized as including beveled outer surfaces which extend generally to the respective terminal ends of said retaining members.

5. In the device of claim 2, said retaining members being in inverted relation to the closure members on the respective legs thereof.

* * * * *